Figure 4:
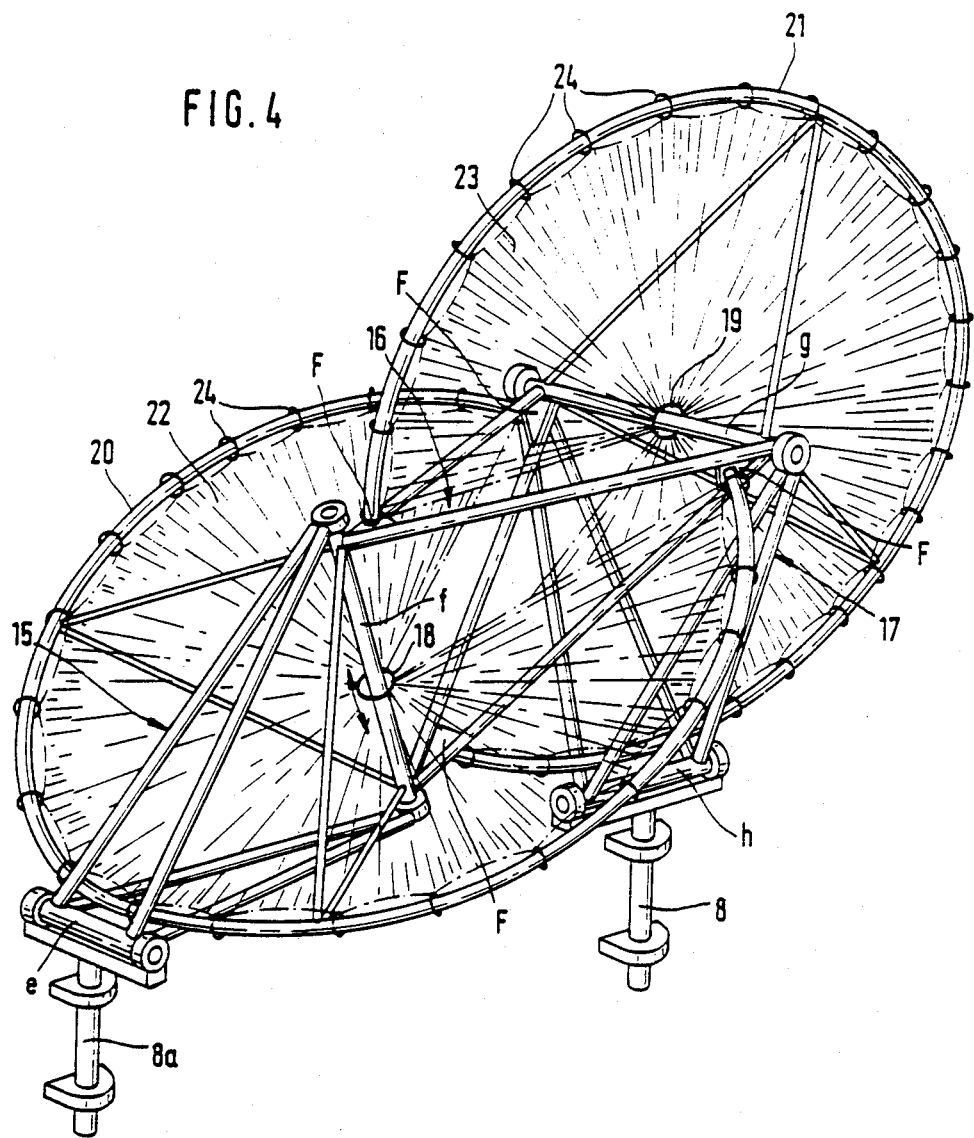
Figure 7:
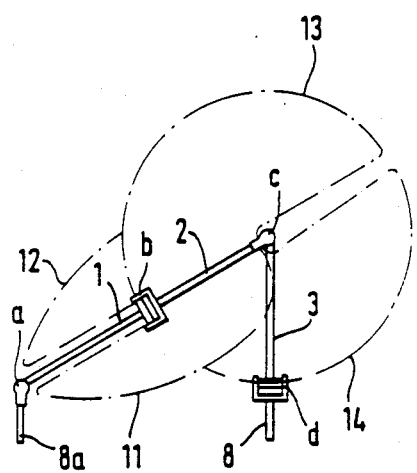
Figure 8:
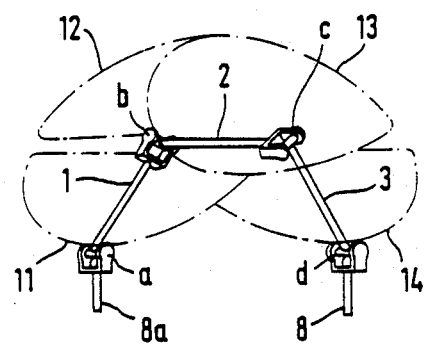
Figure 7A:
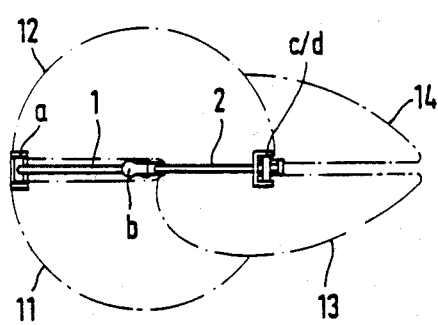
Figure 8A:
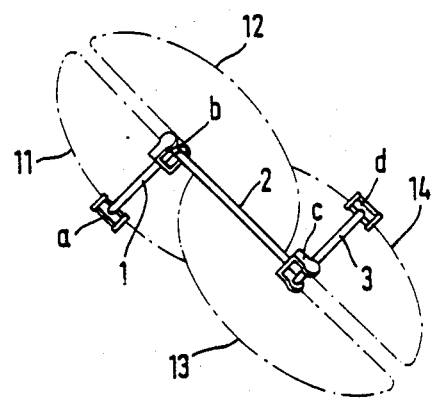

United States Patent [19]

Dettwiler

[11] Patent Number: 4,880,353

[45] Date of Patent: Nov. 14, 1989

[54] DEVICE FOR CONVERTING THE ENERGY OF A FLOWABLE MEDIUM INTO A TORQUE

[76] Inventor: Hermann Dettwiler, Hauptstrasse 45, Ziefen, Switzerland, CH-4417

[21] Appl. No.: 168,655

[22] Filed: Mar. 16, 1988

[30] Foreign Application Priority Data

Mar. 17, 1987 [CH] Switzerland ............................ 999/87

[51] Int. Cl.⁴ ................................................ B63H 1/30
[52] U.S. Cl. .......................................... 416/83; 416/81
[58] Field of Search ................................ 416/83, 78–82

[56] References Cited

U.S. PATENT DOCUMENTS

| | | | |
|---|---|---|---|
| 940,753 | 11/1909 | Tower | 416/83 |
| 1,093,693 | 4/1914 | Glenn | 416/83 |
| 1,729,676 | 10/1929 | Meindersma | 416/78 |
| 1,903,551 | 4/1933 | Meindersma | 416/78 |
| 3,215,371 | 11/1965 | Schmidt | 416/83 X |
| 3,508,840 | 4/1970 | Lederlin | 416/79 X |
| 3,605,506 | 9/1971 | Kuster et al. | 74/63 |
| 4,753,574 | 6/1988 | Hess | 416/83 |

FOREIGN PATENT DOCUMENTS

| | | | |
|---|---|---|---|
| 494680 | 9/1919 | France | 416/83 |
| 1195068 | 11/1959 | France | 416/83 |
| 8201990 | 12/1983 | Netherlands | 416/DIG. 8 |
| 216760 | 1/1942 | Switzerland | 416/83 |
| 361701 | 6/1962 | Switzerland | . |
| 366710 | 2/1963 | Switzerland | . |
| 533275 | 3/1973 | Switzerland | . |
| 555490 | 10/1974 | Switzerland | . |

OTHER PUBLICATIONS

"Rythumusforschung and Technik" Verlage Freies Geistesleben, 1975.

*Primary Examiner*—Everette A. Powell, Jr.
*Attorney, Agent, or Firm*—Ralph W. Selitto, Jr.

[57] ABSTRACT

A device for converting the energy of a flowable medium into torque, or vice versa, employs a pair of linkages positioned on opposite sides of a common mount such that the linkages form mirror images of each other. Each linkage comprises a plurality of link members which are pivotally attached to each other. A first rotatable axle is attached to one end of each linkage, while a second rotatable axle is attached to an opposite end of each linkage.

18 Claims, 5 Drawing Sheets

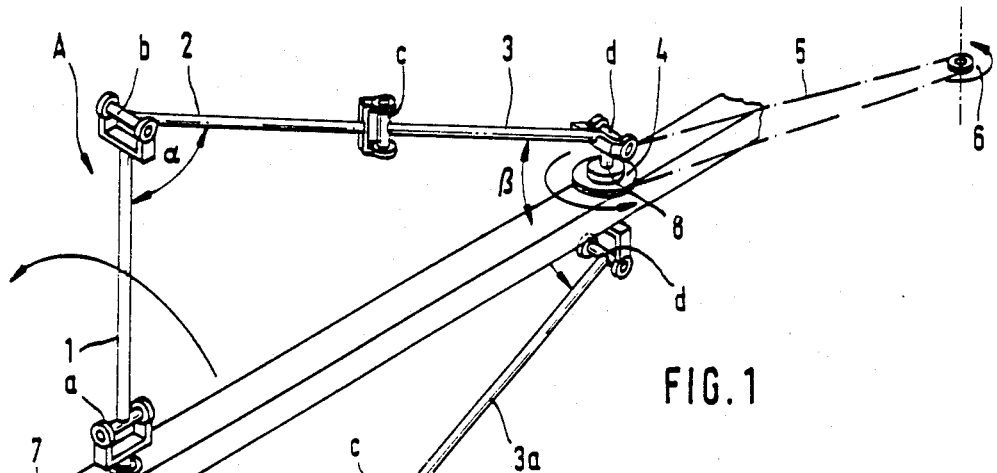
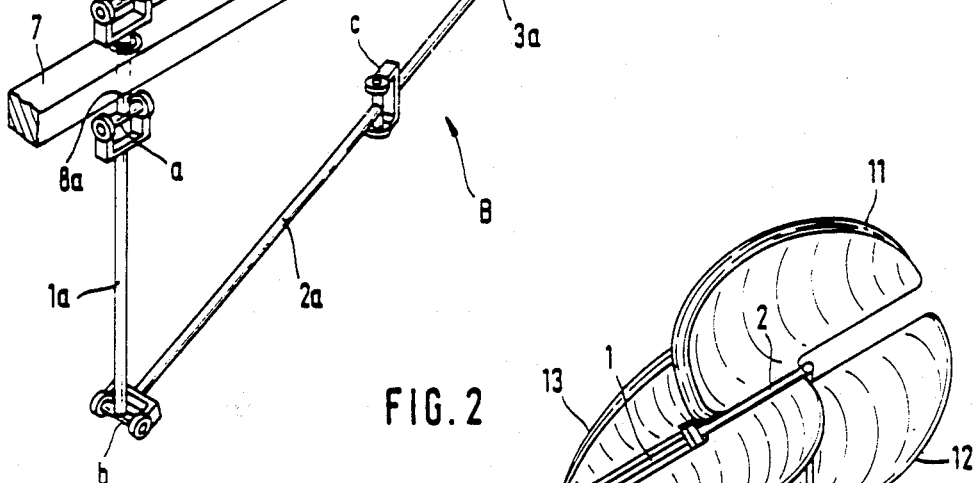
FIG. 1
FIG. 2
FIG. 3

FIG.5
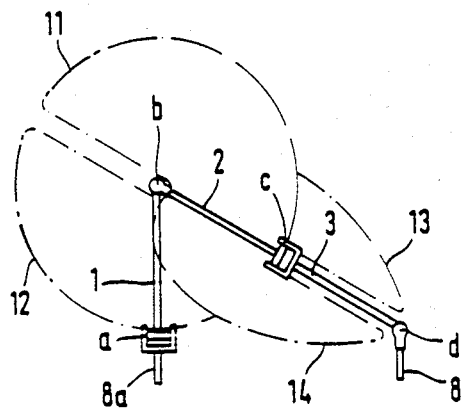
FIG.6
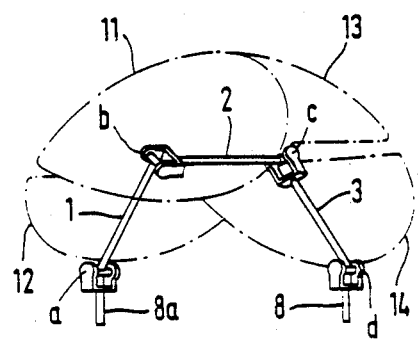
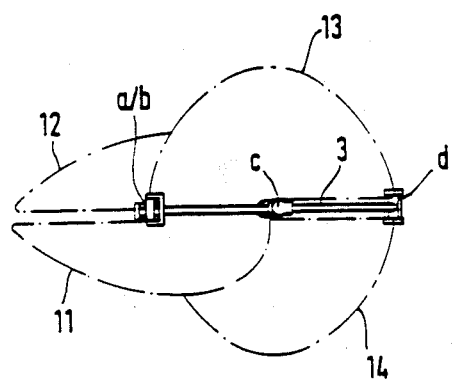
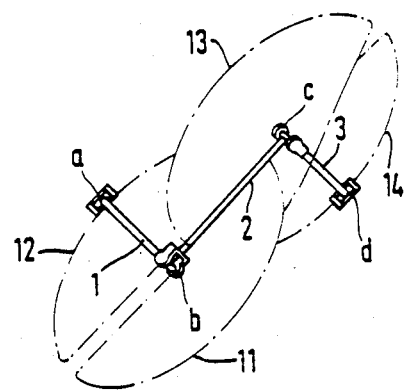
FIG.5a
FIG.6a

DEVICE FOR CONVERTING THE ENERGY OF A FLOWABLE MEDIUM INTO A TORQUE

The present invention relates to a device according to the pre-characterizing clause of the independent patent claim 1.

Since its discovery by Paul Schatz, the reversible cube has been discussed in many publications and also used in engineering. A comprehensive description of research results relating to this is to be found in Paul Schatz: "Rhythmusforschung und Technik" ("Rhythm research and techniques"), Verlag Freies Geistesleben, 1975. Practical applications are, for example, the subject of Swiss Patent Nos. 216,760, 361,701, 366,710 and 555,490.

One of the essential elements of the reversible cube is the cube chain which can generate a wobbling and rotating body movement and which has been used for driving mixing machines. On the contrary, it has not yet been possible hitherto for the special movement characteristic of the reversible cube chain to be harnessed for utilizing the energy present in flowing media or for driving vehicles.

The object of the present invention is to propose a device which is based on the principle of the reversible cube chain, can be used both as a wind wheel and as a water wheel and, furthermore, can be used instead of ship's screws, aircraft propellers and helicopter rotors and which, in contrast to the known rotating devices, corresponds much more closely to the type of movement of the flowing media, that is to say air and water, and therefore works with considerably higher efficiency.

This object is achieved by means of a device which is defined in the characterizing clause of the independent Patent claim 1.

Because of the special movement characteristic inherent in the cube chain, the revolving and rolling movements of air and water take up the blade-like and wing-like driving elements of the new device as if they were an integral part of the medium flowing round them. Flows which increase these tendencies even further can be obtained if the medium is guided in a controlled way.

As has been confirmed by tests on models, in contrast to a blade wheel with a fixed mounting, the advantage of the movement obtainable by means of the reversible cube chain is that the incident medium wave each time engages at least one of the blades located on the device and drives it through 90° of the rotational movement which at the same time also pushes the blade beyond the triangular point of the cube chain which is favorable in terms of torque. The next-following blade passes through virtually underneath the medium wave in a movement in the opposite direction in order, after the expiry of the 90° rotational movement, to present its working surface to the medium, but this time on the opposite side. After four blade passes, the cube chain has completed one revolution.

An exemplary embodiment of the device according to the invention, together with some alternative forms of construction, is described below with reference to the accompanying drawing.

Figure 9:
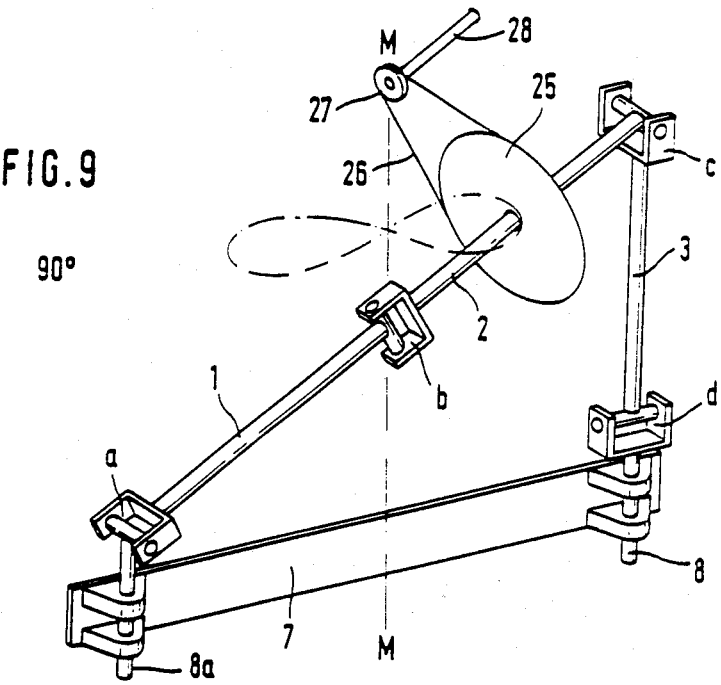
Figure 11:
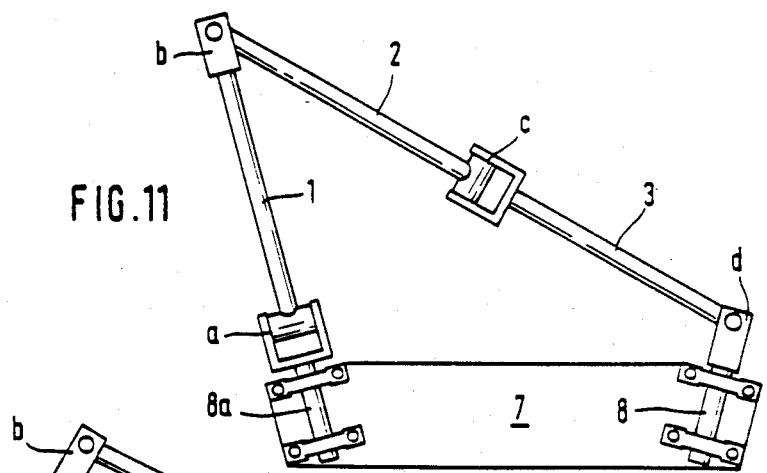
Figure 10:
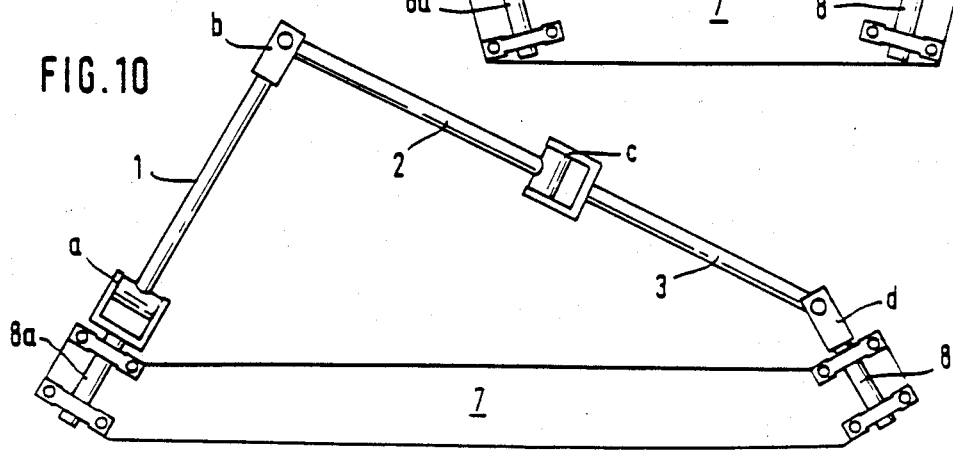

FIG. 1 shows the arrangement of two half cube chains on a common frame,

FIG. 2 illustrates the arrangement of four driving blades by means of a simplified perspective representation, FIG. 3 shows the device illustrated in FIG. 2 in another phase of movement, FIG. 4 is a perspective representation of an alternative embodiment, FIGS. 5 to 8 show side views of four typical phases of movement of the device, in which the device must be thought of as being rotated 90° further from one figure to the next, FIGS. 5a to 8a are the associated plan views, FIG. 9 illustrates a further possibility for the take-off or transmission of the torque occurring on the device, and FIGS. 10 and 11 show further possible constructional modifications of the device.

According to FIG. 1, two half cube chains A and B are mounted on a common mount 7. Each half cube chain A and B has, in a known way, two lateral articulated arms 1, 3 and 1a, 3a, between which the middle articulated arms 2 and 2a is arranged. The lateral articulated arms 1, 3, 1a and 3a are mounted in the mount 7 so as to be loosely rotatable by means of fixed axles 8, 8a, in the twin arrangement shown a single axle 8, 8a being sufficient for both articulated arms 1/1a and 3/3a.

Arranged both on the fixed axles 8, 8a and at the transition from one articulated arm to the adjacent arm are pivot pins a, b, c and d which extend transversely relative to the respective axles of the articulated arms and which perform the function of a hinge. As shown in FIG. 1, the four pivot pins a, b, c and d are offset respectively 90° relative to one another in succession.

In the embodiment according to FIG. 1, the fixed axle 8 is equipped with a V-belt pulley 4 which is connected to a driving or driven wheel 6 via a V-belt 5. If the device is driven by means of the V-belt pulley 15, the two cube chains halves A and B describe the known characteristic movement.

If the arrangement shown in FIG. 1 is to be used, for example, for exploiting wind energy, then, according to FIGS. 2 and 3, for example the middle articulated arms 2 and 2a can each have fastened to them four, that is to say altogether eight driving blades 11, 12, 13, 14, and 11a, 12a, 13a, 14a . This embodiment according to FIGS. 2 and 3 shows a blade form which is made shell-shaped and which extends respectively from the middle articulated arm 2, 2a via an adjoining articulated arm covered when the middle and adjoining articulated arms (2, 1 and 2a, 1a in the phase movement according to FIG. 2) are aligned with one another. The form of the driving blades can be modified within a wide scope by a person skilled in the art.

A preferred embodiment is shown in FIG. 4 which, in contrast to FIGS. 1 to 3, shows only a single half cube chain, but which can be combined directly via the fixed axles 8, 8a with a further cube chain arranged underneath.

Here too, the half cube chain comprises, once again, three articulated arms which are designated by 15, 16 and 17 and which are joined together as frame structures from tubes welded to one another. The four hinge-like pivot pins are designated by e, f, g and h here and perform the same basic function as the pivot pins a to d in FIG. 1. An additional function of the pivot pins f and g is to be seen in the fact that they serve as a guide for a ring 18, 19 which is located in the center of a sheet 22, 23 held by an arcuate frame 20, 21. The sheet 22, 23 which can consist, for example, of sailcloth or a plastic resistant to tearing is anchored at the edges on the frame 20, 21 via eyelets 24 and centrally on the ring 18, 19.

Furthermore, since the sheet 22, 23 is not stretched tautly, but hangs relatively loosely in the respective frame, it can swell in the wind and assume the particular form which is the most favorable, the rings 18, 19 sliding loosely on the pivot pins f and g.

The contours of the two driving blades 22 and 23 which are limited by arcuate frames 20 and 21 are basically freely selectable, insofar as they do not collide with the mount structure. However, a preferred embodiment is characterized by a shape, according to which the frames 22, 23 correspond, in their arc segments located opposite the fastening points F, to the two runners of an oloid. The total efficiency of the device can be improved appreciably in this way. The oloid likewise developed by Paul Schatz is described in Swiss Patent No. 500,000.

The surprisingly effective function of the device described, which is matched much more closely to the inherent dynamics of the flowable medium than the known rotational systems, is a direct result of the characteristic kinematics of the cube chain. FIGS. 5 to 8 show side views and FIGS. 5a to 8a corresponding plan views of four different phases of the cycle of movement, which differ from one another respectively by an angle of 90° measured at the axles 8, 8a.

If the device described with reference to FIG. 4 is operated, for example, as a wind wheel and the torque derived from the wind energy is taken off at one of the rotating axles 8/8a or even at both of them, because of the kinematics inherent in the cube chain there is necessarily an uneven rotational movement which can be corrected, if required, by means of appropriate known mechanisms (see, for example, Swiss Patent Specification 361,701). One possible way of avoiding this correction is shown in FIG. 9, in which the reference numerals already introduced have been preserved insofar as they denote the same parts.

A V-belt pulley 25 is fastened rigidly in terms of rotation in the central region of the middle articulated arm 2 and is connected to a driven pulley 27 by means of a V-belt 26. The driven pulley 27, which itself can be coupled to a generator via a shaft 28, is arranged above the device as a whole, specifically in its mid-axis M-M. During a cycle of movement of the device, although the V-belt pulley 25 describes a leminscate L, in this embodiment the rotational movement occurring on the driven pulley 27 is uniform. It goes without saying that, instead of belt pulleys and transmission belts, it is also possible to use chain drives or other endless transmission elements which, if necessary, can be mounted with an elastic prestress in order to compensate constructive plays.

It may also be mentioned expressly that the exemplary embodiments described serve both for transmitting and for receiving a rotary movement, that is to say can be used both for driving land, water and air vehicles and for converting flow energy into a torque, for example in the form of a wind wheel. Use as a fan is also possible.

The device described can be modified in many respects by a person skilled in the art within the scope of the inventive idea. Thus, for example, the size ratios of the three articulated arms 1, 2 and 3 can be varied, to the extent that the middle articulated arm 2 is larger than, the same size as or smaller than the two lateral articulated arms 1 and 3. The angles identified by $\alpha$ and $\beta$ in FIG. 1 and here amounting to 90° and 30° also do not have to be adhered to.

As already mentioned, the size of the driving elements can also be made variable. Thus, the driving elements can be made fan-like or be equipped with blinds, as a result of which the working surfaces or the running characteristics can be varied.

An inclination of the axles 8 and 8a can also be advantageous in many alternative versions, as shown in FIGS. 10 and 11. This affords the possibility of satisfying different operating requirements by changing the interaction of blades and medium as a result of a variation of the axle inclination.

In the present connection, the expression "blade-like or wing-like driving elements" is intended to embrace all rigid or flexible sheet-like structures, such as metal blades, sheets made of plastic or sailcloth etc, in the various expedient forms.

I claim:

1. A device for converting the energy of a flowable medium into a torque, or vice versa, comprising a pair of linkages supported by a common mounting means for mounting said linkages such that one of said linkages is positioned on one side of a first imaginary plane which contains said mounting means and the other of said linkages is positioned on an opposite side of said first plane so as to form a mirror image of said one linkage, said mounting means including a first rotatable axle which is perpendicular to said first plane and which extends from said one side thereof to said opposite side thereof and a second rotatable axle which is perpendicular to said first plane and which extends from said one side thereof to said opposite side thereof, said second axle being parallel to said first axle and spaced a predetermined distance therefrom, said one linkage including a first link member pivotally connected to said first axle by a first pivot pin attached to said first axle so as to be conjointly rotatable therewith, whereby said first link member is pivotable about said first pivot pin in response to the rotation of said first axle, a second link member pivotally connected to said second axle by a second pivot pin attached to said second axle so as to be conjointly rotatable therewith, whereby said second link member is pivotable about said second pivot pin in response to the rotation of said second axle, and a third link member pivotally connected to said first link member by a third pivot pin and to said second link member by a fourth pivot pin such that when said first link member extends from said first axle in a direction which is perpendicular to said first plane said first, second and third link members all lie in a second imaginary plane which is perpendicular to said first plane and such that when said first, second and third link members all like in said second plane said first pivot pin is parallel to said first and second planes, said second pivot pin is parallel to said first plane and perpendicular to said second plane, said third pivot pin is parallel to said first plane and perpendicular to said second plane, and said fourth pivot pin is arranged at an inclined angle relative to said first plane and is parallel to said second plane, and said other linkage including a fourth link member pivotally connected to said first axle by a fifth pivot pin attached to said first axle so as to be conjointly rotatable therewith, whereby said fourth link member is pivotable about said fifth pivot pin in response to the rotation of said first axle, a fifth link member pivotally connected to said second axle by a sixth pivot pin attached to said second axle so as to be conjointly rotatable therewith, whereby said fifth link member is pivotable about said sixth pivot pin in response to the rotation of said second axle, and a sixth link member pivotally connected to said fourth link member by a third pivot pin and to said fifth link member by an eighth pivot pin such that when said fourth link member extends from said first axle in a direction which is perpendicular to said first plane said fourth, fifth and sixth link members all lie in said second plane and such that when said fourth, fifth and sixth link members all lie in said second plane said fifth pivot pin is parallel to said first and second planes, said sixth pivot pin is parallel to said first plane and perpendicular to said second plane, said seventh pivot pin is parallel to said first plane and perpendicular to said second plane, and said eighth pivot pin is arranged at an inclined angle relative to said first plane and is parallel to said second plane; a first set of driving elements attached to said one linkage; and a second set of driving elements attached to said other linkage.

2. A device according to claim 1, wherein said first set of driving elements is attached to at least one of said first, second and third link members and wherein said second set of driving elements is attached to at least one of said fourth, fifth and sixth link members.

3. A device according to claim 1, wherein said first link member cooperates with said first pivot pin to define a first triangular frame structure, said first pivot pin supporting a first frame which loosely suspends a first flexible driving element therefrom and which is connected to said third link member in the vicinity of said second pivot pin; said second link member cooperates with said second pivot pin to define a second triangular frame structure, said second pivot pin supporting a second frame which loosely suspends a second flexible driving element therefrom and which is connected to said third link member in the vicinity of said first pivot pin; said fourth link member cooperates with said fifth pivot pin to define a third triangular frame structure, said fifth pivot pin supporting a third frame which loosely suspends a third flexible driving element therefrom and which is connected to said sixth link member in the vicinity of said sixth pivot pin; and said fifth link member cooperates with said sixth pivot pin to define a fourth frame structure, said sixth pivot pin supporting a fourth frame which loosely suspends a fourth flexible driving element therefrom and which is connected to said sixth link member in the vicinity of said fifth pivot pin.

4. A device according to claim 3, wherein said first frame is offset by an angle of ninety degrees relative to said second frame, said first and second frames being arranged in overlapping relationship with respect to each other, and said third frame is offet by an angle of ninety degrees relative to said fourth frame, said third and fourth frames being arranged in overlapping relationship with respect to each other.

5. A device according to claim 4, wherein each of said first, second, third and fourth frames has a shape which corresponds to two runners of an oloid.

6. A device according to claim 5, wherein said first driving element includes a first sheet having a centrally located ring slidably disposed about said first pivot pin, said second driving element includes a second sheet having a centrally located ring slidably disposed about said second pivot pin, said third driving element includes a third sheet having a centrally located ring slidably disposed about said fifth pivot pin, and said fourth driving element includes a fourth sheet having a centrally located ring slidably disposed about said sixth pivot pin.

7. A device according to claim 2, wherein said first set of driving elements is attached to said third link member and wherein said second set of driving elements is attached to said sixth link member.

8. A device according to claim 7, wherein said first set of driving elements includes a first pair of wings extending outwardly from said third link member and a second pair of wings extending outwardly from said third link member and wherein said second set of driving elements includes a third pair of wings extending outwardly from said sixth link member and a fourth pair of wings extending outwardly from said sixth link member.

9. A device according to claim 1, further comprising transmitting means for transmitting torque to or from said device, said transmitting means being connected to one of said first and second axles.

10. A device according to claim 1, further comprising a first wheel connected to said third link member intermediate opposite ends thereof such that said first wheel is rotatable conjointly with said third link member and first rotating means for rotating said first wheel, said first rotating means being connected to said first wheel and being located centrally of said device.

11. A device according to claim 10, further comprising a second wheel connected to said sixth link member intermediate opposite ends thereof such that said second wheel is rotatable conjointly with said sixth link member and second rotating means for rotating said second wheel, said second rotating means being connected to said second wheel and being located centrally of said device.

12. A device according to claim 1, wherein each driving element of said first set of driving elements is adjustably attached to said one linkage and wherein each driving element of said second set of driving elements is adjustably attached to said other linkage.

13. A device according to claim 1, wherein said device converts wind energy into torque.

14. A device according to claim 13, wherein said device is freely rotatable, whereby the orientation of said device can be varied to accommodate changes in wind direction.

15. A device according to claim 1, wherein said device is a rotor of a helicopter.

16. A device according to claim 1, wherein said device is a propeller of a ship.

17. A device according to claim 1, wherein said first axle rotates in one arcuate direction as said second axle rotates in an opposite arcuate direction.

18. A device according to claim 17, wherein as said first axle rotates in said one arcuate direction said third and seventh pivot pins move to one side of said second plane and as said second axle rotates in said opposite arcuate direction said fourth and eighth pivot pins move to the other side of said second plane.

* * * * *